United States Patent [19]

Dunne et al.

[11] Patent Number: 5,740,375
[45] Date of Patent: Apr. 14, 1998

[54] FORWARDING INTERNETWORK PACKETS BY REPLACING THE DESTINATION ADDRESS

[75] Inventors: James W. Dunne, Boston; Igor Lasic, Allston, both of Mass.

[73] Assignee: Bay Networks, Inc., Santa Clara, Calif.

[21] Appl. No.: 601,779

[22] Filed: Feb. 15, 1996

[51] Int. Cl.[6] .................................................. H04J 15/00
[52] U.S. Cl. ...................... 395/200.68; 395/200.48; 395/200.5; 395/200.58; 395/200.62; 370/235; 370/389; 370/400
[58] Field of Search .................... 395/200.01, 200.02, 395/200.06, 200.12, 200.15, 200.68, 200.47, 200.48, 200.5, 200.58, 200.62, 200.66, 200.75, 200.76; 370/229, 235, 352, 356, 389, 400

[56] References Cited

U.S. PATENT DOCUMENTS

| | | | |
|---|---|---|---|
| 4,734,907 | 3/1988 | Turner | 370/60 |
| 5,402,415 | 3/1995 | Turner | 370/60 |
| 5,550,816 | 8/1996 | Hardwick et al. | 370/60 |
| 5,566,170 | 10/1996 | Bakke et al. | 370/60 |
| 5,606,668 | 2/1997 | Shwed | 395/200.11 |
| 5,608,726 | 3/1997 | Virgile | 370/401 |
| 5,633,869 | 5/1997 | Burnett et al. | 370/396 |
| 5,636,210 | 6/1997 | Agrawal | 370/390 |

*Primary Examiner*—James P. Trammell
*Assistant Examiner*—Patrick J. Assouad
*Attorney, Agent, or Firm*—Blakely, Sokoloff, Taylor & Zafman

[57] ABSTRACT

A method for filtering and forwarding local broadcast traffic across network boundaries. According to one embodiment, the method comprises the step of providing a broadcast list for a source network wherein the broadcast list includes at least one entry that specifies a network address. When a local broadcast packet is received from the source network, a copy of the local broadcast packet is made for each entry in the broadcast to produce a copied packet. The destination address of each copied packet is replaced with a corresponding destination address of a broadcast list to produce a modified packet, and the modified packets are transmitted such that the modified packets are delivered to networks specified by the broadcast list.

8 Claims, 7 Drawing Sheets

| DATA LINK LAYER HEADER 505 | NETWORK LAYER HEADER 510 | TRANSPORT LAYER HEADER 515 | DATA 520 |

FIG. 5 (PRIOR ART)

| 605 | ... | SOURCE MAC ADDRESS 610 | DESTINATION MAC ADDRESS 615 |

FIG. 6 (PRIOR ART)

| VERSION 705 | ... | SOURCE IP ADDRESS 710 | DESTINATION IP ADDRESS 715 |

FIG. 7 (PRIOR ART)

FORWARDING INTERNETWORK PACKETS BY REPLACING THE DESTINATION ADDRESS

FIELD OF THE INVENTION

The present application relates generally to the filtering and forwarding of internetwork traffic and more particularly to a filter that forwards internetwork packets by replacing the destination address.

BACKGROUND OF THE INVENTION

A typical digital communications network has a network architecture based upon the Open Systems Interconnection (OSI) Reference Model in order to provide communication between a multiplicity of interconnected digital end systems or "nodes." The OSI Reference Model segments networking protocols into seven layers, which are listed, in ascending order of abstraction, as follows: 1) the physical layer, 2) the data link layer, 3) the network layer, 4) the transport layer, 5) the session layer, 6) the presentation layer, and 7) the application layer.

Internetworking devices such as repeaters, bridges, and routers, each of which operates at a different layer of the OSI Reference Model, are used to interconnect two or more networks so that hosts or "data terminal equipment" (DTE) coupled to the different networks may communicate with one another. Repeaters, also known as "concentrators" and "hubs," operate at the physical layer, which provides the electrical and mechanical interface to the physical medium of the network. Bridges operate at the data link layer, which handles the access to the physical medium of the network. Finally, routers operate at the network layer, which initiates and terminates network connections and manages routing, data sequencing, and error detection and recovery.

Routers are typically provided with a set of traffic filters that are used to determine the manner in which received packets are to be processed and forwarded. Useful traffic-shaping functions are determined by the desired topology of the network. For example, the local broadcast packets of a subnetwork are typically filtered out and dropped at the router because local broadcast packets are typically intended to propagate only to hosts coupled to the originating subnetwork. However, for distributed client/server systems, it may be desirable to allow the local broadcast traffic of a host that is connected to a first subnetwork to cross subnetwork boundaries and propagate to user-selected subnetworks that are located more than one "hop" away from the first subnetwork, wherein each hop comprises a router.

SUMMARY OF THE INVENTION

Therefore, a method for filtering and forwarding local broadcast traffic across network boundaries is described. According to one embodiment, the method comprises the step of providing a broadcast list for a source network wherein the broadcast list includes at least one entry that specifies a network address. When a local broadcast packet is received from the source network, a copy of the local broadcast packet is made for each entry in the broadcast to produce a copied packet. The destination address of each copied packet is replaced with a corresponding destination address of a broadcast list to produce a modified packet, and the modified packets are transmitted such that the modified packets are delivered to networks specified by the broadcast list.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 5 shows a prior art format for a data packet.

FIG. 6 shows the format of a datalink layer header.

FIG. 7 shows the format of a network layer header

DETAILED DESCRIPTION

According to present embodiments, when a router receives a local broadcast packet, the router checks the source address of the local broadcast packet to determine whether the originating subnetwork is enabled to propagate local broadcast packets across subnetwork boundaries. If so, the router checks a broadcast list containing the network addresses of subnetworks to which the local broadcast packet should be sent. A copy of the local broadcast packet is made for each entry of the network list, and the destination address of each copy of the local broadcast packet is replaced with a corresponding destination address from the broadcast list, and the copies of the local broadcast packet are thereafter transmitted to the subnetworks indicated by the respective destination addresses.

Filtering—Generally

Figure 1:
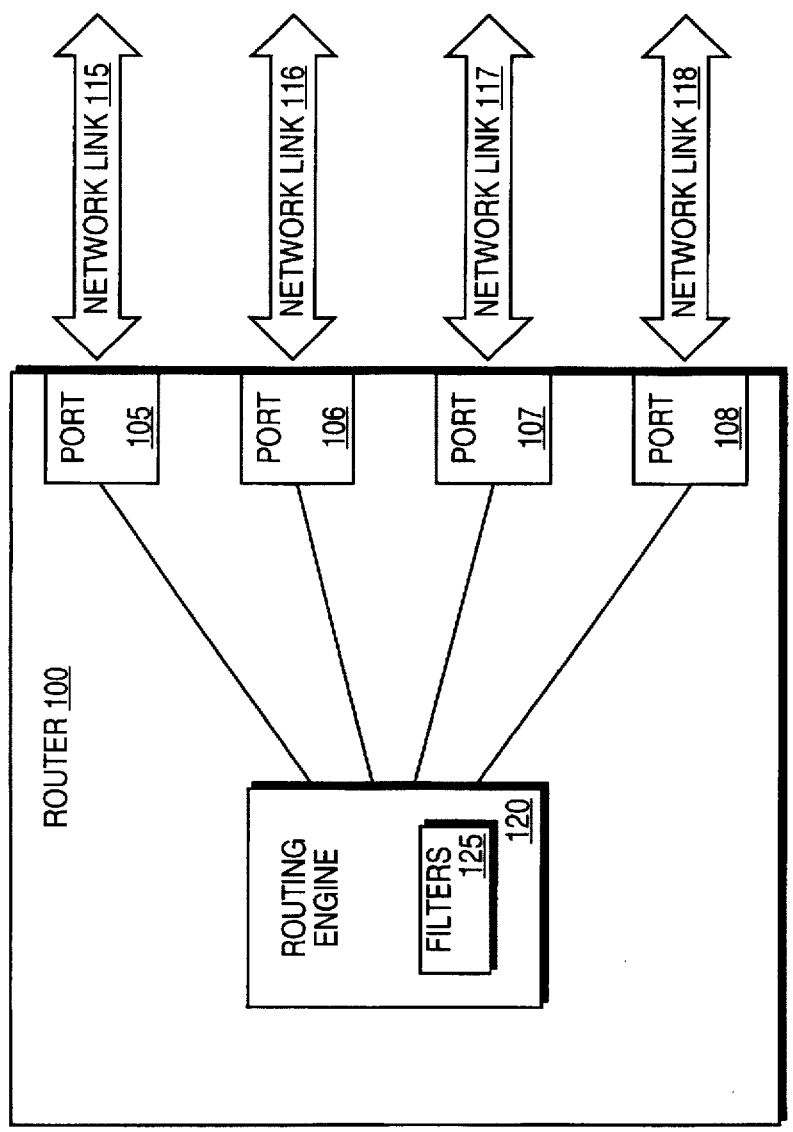
FIG. 1 shows a prior art router that is capable of performing filtering functions.

Prior to discussing the above-mentioned filtering function in detail, traffic filters are generally discussed with respect to prior art FIGS. 1–7. FIG. 1 shows a prior art router that is capable of performing the above-mentioned filtering function. Router 100 generally comprises a plurality of ports 105–108 that are each coupled to a corresponding network link 115–118, respectively. A routing engine 120 is coupled to each of the ports 105–108 for processing and forwarding packets received from the ports using the included filters 125. A routing engine typically comprises a central processing unit (CPU) (not shown), a packet memory, and a system memory wherein the system memory typically stores application programs that provide filtering functions. Thus, filters 125 may actually be software entities stored in the main memory. Alternatively, filters may be provided using hardware.

Figure 2:
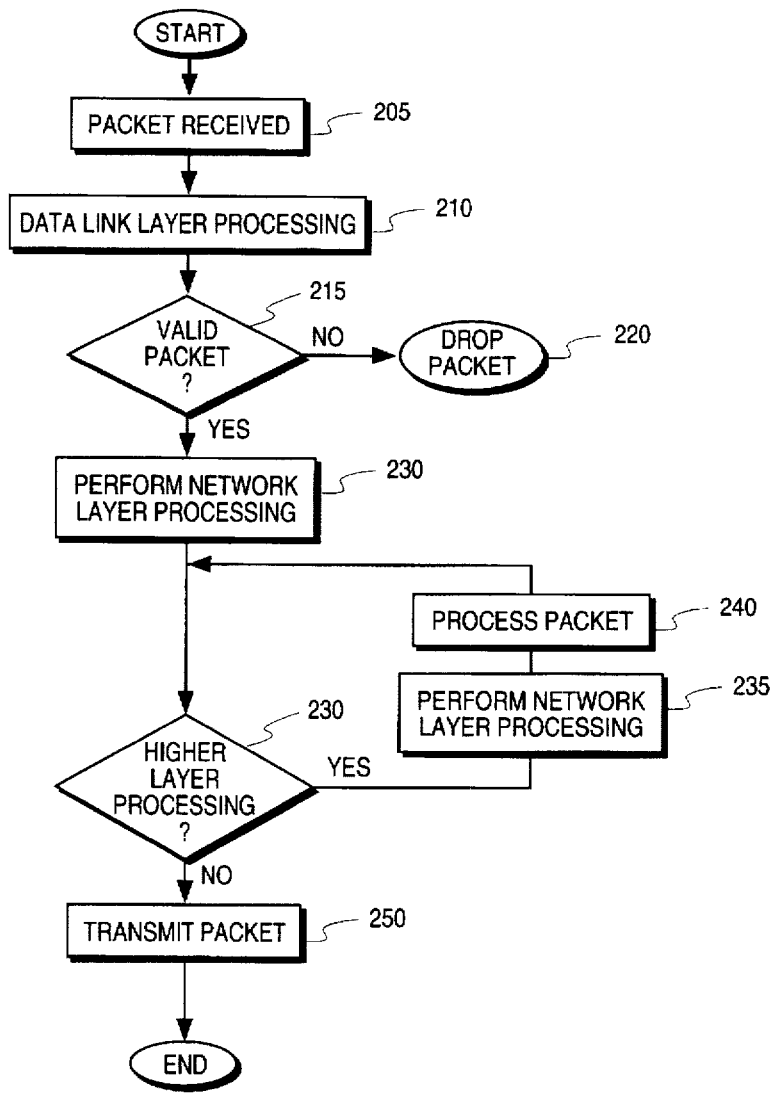
FIG. 2 shows a prior art method for processing and forwarding network packets.

Prior art FIG. 2 shows a basic method for processing and forwarding network packets. In general, the steps of the processing and forwarding are divided roughly along the lines of the seven layer network protocol of the OSI reference model. As is well known, each layer of the seven layer OSI reference model provides information and services to the layer above it. The method in FIG. 2 follows this paradigm.

At process block 205, a package is received from one of the ports. Routing engine 120 stores the packet in the packet memory (not shown) and the CPU (not shown) uses application programs stored in the main memory (not shown) and the filters 125 to perform the processing and forwarding of the packet. At process block 210, datalink layer processing is performed by routing engine 120. If the datalink layer processing determines that the packet is invalid at process block 215, the packet is dropped at process block 220. If the datalink layer processing determines that the packet is valid, network layer processing may proceed at block 225.

Network layer processing is typically performed according to a network layer protocol such as the internet protocol. In addition to IP processing, routing functions such as those provided by RIP and OSPF may also be performed at the network layer. Once network layer processing has been performed it is determined at process block 230 whether higher level processing is to occur. For example, if transport layer processing using the TCP or URP protocols is to occur, the packet is passed on to the software entity that controls TCP or URP processing at process block 235, whereupon the software entity processes the packet at process block 240. If still further higher layer processing, e.g. application layer processing is to occur at process block 230, process steps 235 and 240 are performed by the correspondingly invoked software entity. If higher layer processing is not required at process block 230, the packet may be transmitted at process block 250, whereupon the filtering processing ends. It should be noted that multiple types of actions may be performed by the process of filtering, and transmitting or forwarding the packet is only one of the possible actions. Alternative actions include dropping the packet.

Figure 3:
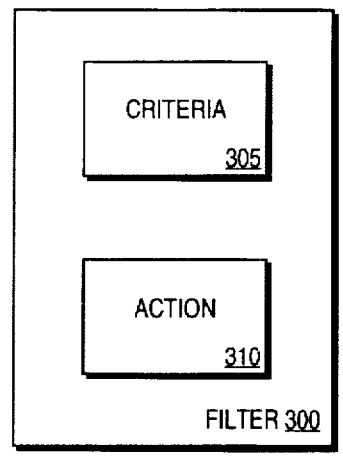
FIG. 3 shows the basic form of a prior art traffic filter.

FIG. 3 shows the basic form of a traffic filter according to the prior art. Filter 300 is shown as generally comprising a set of criteria 305 and a prescribed action 310. The specific traffic filter described herein is performed at the network layer by an IP entity, but traffic filters may be utilized at any one of the seven layers of the OSI reference model in order to provide the desired processing and forwarding of packets. It should be noted that lower layer filtering provides increased granularity in the decision making process. Therefore, to the extent that the functions normally ascribed to a higher layer protocol may be assigned to a protocol that operates the next lower layer, it is desirable to do so.

Figure 4:
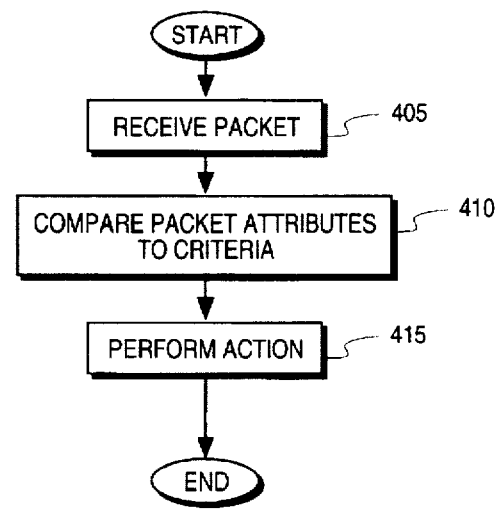
FIG. 4 is a flow chart showing a prior art method for applying a filter to a received packet.

FIG. 4 is a flow chart showing a method for applying a filter to a received packet. The process starts, and the packet is received at process block 405. At process block 410, the routing engine utilizes the filter to compare the attributes of the received packet to the criteria specified by the filter. The criteria used to filter a packet may comprise any attribute of the received packet. For example, common criteria include source IP address, destination IP address, source MAC address, destination MAC address, and source port. Any number of combinations of criteria may be used as any portion of the data packet may be used to define an attribute. For example, a user may require that a predetermined data pattern in the payload of a packet results in a filtering action being performed. Once the attributes of the packet have been compared to the criteria an action is performed at process block 415. The action that is performed is determined by the action required by the filter and the outcome of the comparison between the packet attributes and the criteria. For some cases the failure of the packet to meet the criteria of the filter will result in the packet being dropped. In other cases, failure of the packet to meet the criteria of the filter will allow the packet to be forwarded to its destination. The dropping and forwarding functions are perhaps the simplest functions that may be performed by a filter, and the type of actions that may be performed by filters are quite numerous.

FIGS. 5–7 demonstrate the types of packet attributes that may be used as criteria for performing filtering actions. FIG. 5 generally shows a basic network packet as comprising a datalink layer header 505, a network layer header 510, a transport layer header 515, and the data of the packet 520. All the headers are generically referred to based on the layer to which they correspond because there are multiple types of layer specific protocols. For example, ethernet, Token Ring, and FDDI are examples of datalink layer protocols, and each one includes a Media Access Control (MAC) sublayer protocol that specifies a source address and a destination address. FIG. 6 shows a basic datalink layer header as comprising a multiplicity of fields including a source MAC address 610 and a destination MAC address 615. Similarly, FIG. 7 shows a network layer header as comprising a multiplicity of fields that includes a version field 705, and a source IP address field 710, and a destination IP address 715. The network layer header of FIG. 7 is for a network that implements the IP network layer protocol.

Filtering To Propagate Local Packets Across Subnetwork Boundaries

Figure 8:
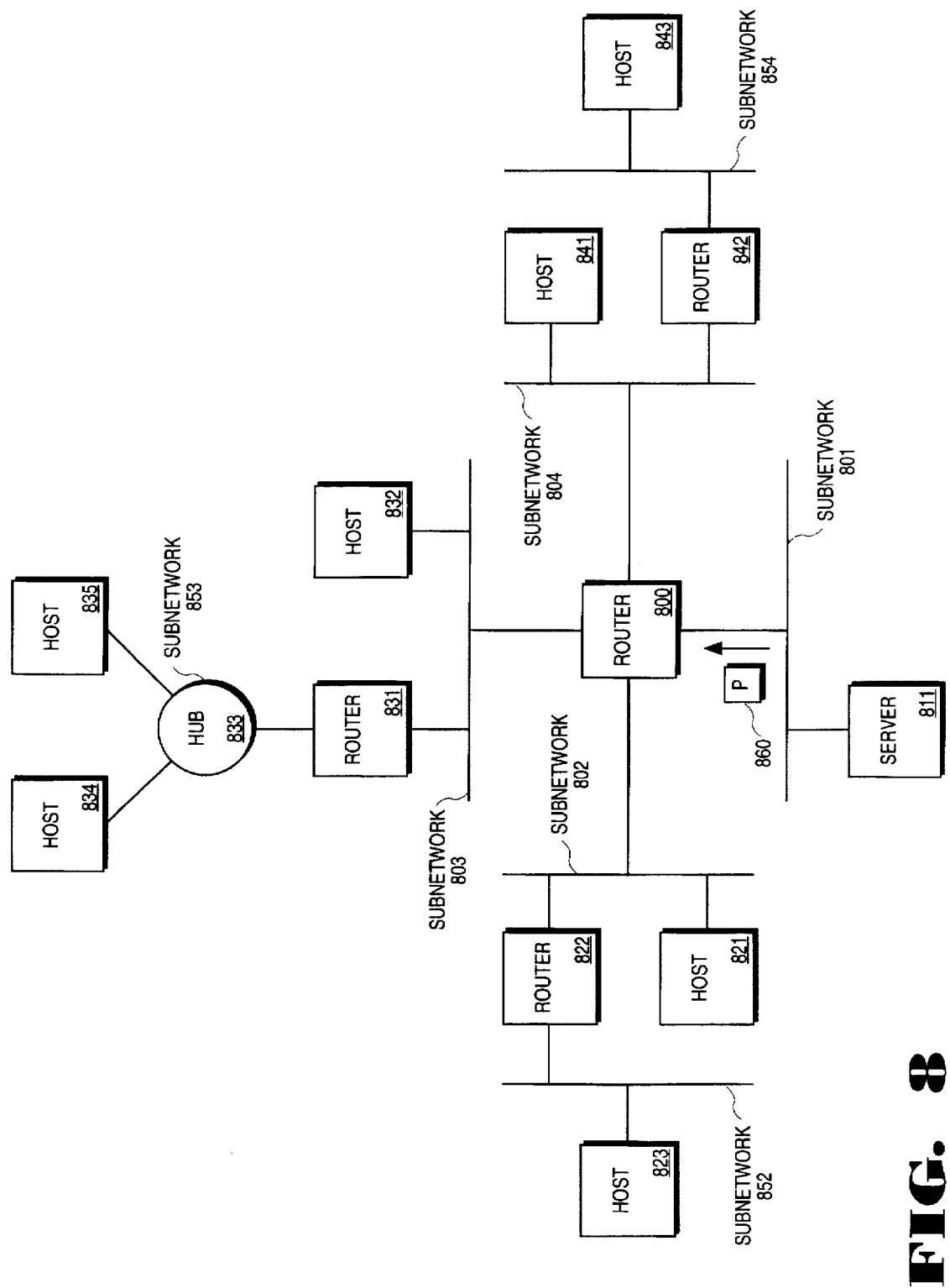
FIG. 8 shows an exemplary network topology that benefits from performing the filtering function of a present embodiment.

Now that the basic aspects of filters have been described, the filtering function of propagating local broadcast packets across subnetwork boundaries will now be discussed with respect to FIGS. 8–11. FIG. 8 shows a sample network topology wherein the ability to propagate local broadcast packets across subnetworks boundaries is desirable. Specifically, FIG. 8 shows a router 800 that includes four ports each coupled to one of subnetworks 801–804, each having a unique network layer address (e.g. IP address). A network server 811 is coupled to subnetwork 801. Server 811 is used as a common resource for each of the hosts connected to the internetwork topology shown in FIG. 8, and it is desirable that each of the hosts shown in FIG. 8 receives all local broadcast communications output by server 811.

Host 821 and router 822 are coupled to subnetwork 802, router 831 and host 832 are coupled to subnetwork 803, and host 841 and router 842 are coupled to subnetwork 804. Furthermore, subnetwork 852 is coupled to a host 823 and a second port of router 822, a subnetwork 853 as defined by hub 833 is coupled to a second port of router 831 and a plurality of hosts 834–835, and a subnetwork 854 is coupled to a second port of router 842 and to a host 843.

Figure 9:
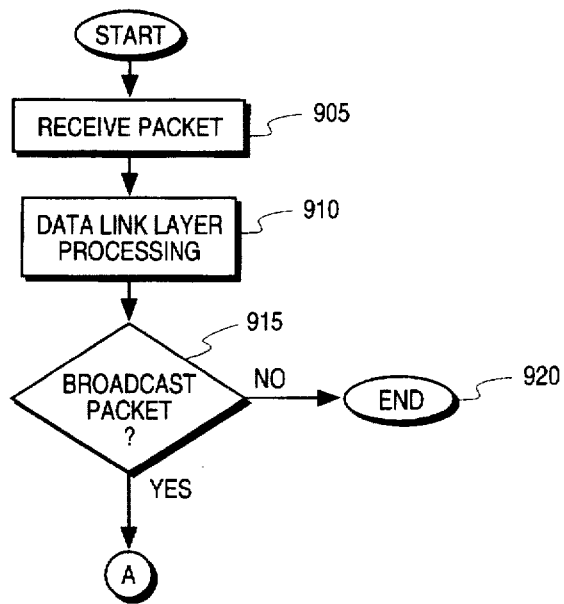
FIG. 9 is a flow chart illustrating the basic filtering function of a present embodiment.

When server 811 issues a local broadcast packet 860, local broadcast packet 860 is received by a first port of router 800, and a basic filtering process such at that shown in FIG. 9 is undertaken. The packet is received at process block 905, and datalink layer processing occurs at process block 910. At process block 915 it is determined whether or not packet 860 is a broadcast packet from a user-selected subnetwork by examining the data link layer header and the included MAC header information. If packet 860 is not a broadcast packet or if packet 860 does not originate from the user-selected subnetwork, the filtering action ends at process block 920. If packet 860 is a broadcast packet from the user-selected subnetwork, the action of forwarding the broadcast packet is shown in FIG. 10.

Figure 10:
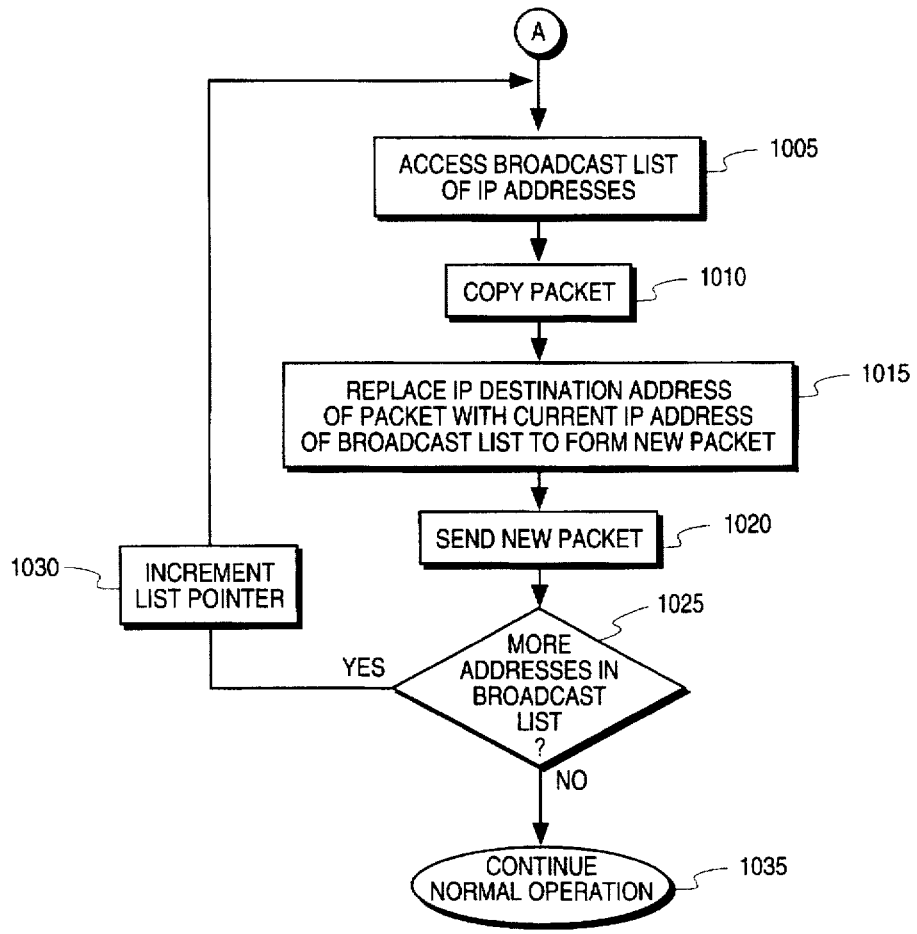
FIG. 10 is a flow chart illustrating filtering and forwarding a packet according to a present embodiment.

FIG. 10 is a flow chart showing steps for filtering and forwarding the packet according to the present embodiment. To enable the transfer of local broadcast traffic across subnetwork boundaries, the user first defines a broadcast list of IP addresses for each of the subnetworks for which it is desired for the local broadcast packets to propagate. At process block 1005, the routing engine accesses the broadcast list of IP addresses that is associated with the initiating server 811. At process block 1010, the received packet is copied. At process block 1015, the IP destination address of the copied packet is replaced with the current IP address indicated by the current IP address pointed to by the list pointer. This process forms a new packet having the original payload but a new destination address. The new packet is sent at process 1020. If more addresses remain in the broadcast list at process block 1025, process steps 1005–1020 are repeated until no more address remain in the broadcast list, whereupon normal operation is continued at process block 1035. Many of the process blocks of FIG. 10 may be performed in parallel. For example when the broadcast list is accessed, it may first determine the number of copies of the packet that must be made, and the copies may be made immediately at that time. The process of replacing the IP address of the original packet may thereafter be performed sequentially or in parallel.

By replacing the destination IP address of the old packet with IP addresses stored by the broadcast list, it may be assured that formerly local broadcast packets are allowed to propagate across multiple hops. Wherein the topology of FIG. 8 shows a maximum of two hops, the fact that IP addresses are used rather than MAC address header broadcast fields ensures that each router can process the packet and forward it to its appropriate destination, regardless of the number of hops that remain to the destination subnetwork. This filtering timelion allows the user to define an internetwork that acts in many ways like a single subnetwork with respect to certain transactions.

Figure 11:
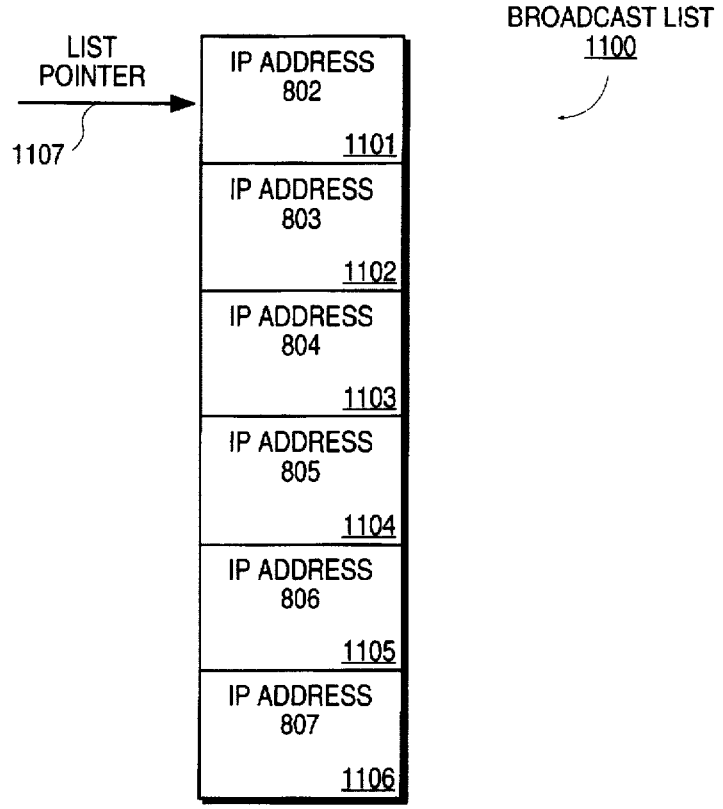
FIG. 11 shows a broadcast list that may be used to implement the filtering function of a present embodiment.

FIG. 11 shows a broadcast list according to the embodiment shown in FIG. 8. Broadcast list 1100 comprises a plurality of entries 1101–1106. A list pointer 1105 is used to point to one of the entries of the broadcast list. As discussed with respect to FIG. 10 the list pointer 1110 is incremented to insure that each of the IP addresses stored as entries in broadcast list 1100 is used to form a new packet which is subsequently transferred to the desired subnetwork. Again, each of the entries in broadcast 1100 may be defined by the user.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for filtering and forwarding local broadcast traffic across network boundaries, comprising:

receiving a local broadcast packet from a source network, said packet having said source network in a destination address field;

copying the local broadcast packet to produce a copied packet;

writing a new address of a destination network to said destination address field of the copied packet, said new address being across a network boundary; and transmitting the copied packet to the destination network.

2. The method of claim 1 wherein the step of receiving a local broadcast packet comprises:

receiving a packet from the source network;

performing data link layer processing of the packet to determine whether the packet is a local broadcast packet;

dropping the packet if the packet is not a local broadcast packet; and continuing processing the packet if the packet is a local broadcast packet.

3. A method for filtering and forwarding local broadcast traffic across network boundaries comprising:

providing a broadcast list for a source network, the broadcast list comprising at least one destination network address being across a network boundary;

receiving a local broadcast packet from the source network, said packet having said source network in a destination address field;

copying the local broadcast packet for each entry in the broadcast list to produce at least one copied packet;

for each copied packet, writing a corresponding destination network address of the broadcast list to a destination address field of the copied packet, said destination address being across a network boundary; and transmitting each packet such that each packer is delivered to a network specified by a destination network address of the broadcast list.

4. The method of claim 3 wherein the step of receiving a local broadcast packet comprises:

receiving a packet from the source network;

performing data link layer processing of the packet to determine whether the packet is a local broadcast packet;

dropping the packet if the packet is not a local broadcast packet; and continuing processing the packet if the packet is a local broadcast packet.

5. A router comprising:

a plurality of ports for coupling to a plurality of subnetworks each having a unique network layer address; and a routing engine coupled to the ports for processing packets received from the plurality of ports, the routing engine including a filter that, when activated for a source network, copies a local broadcast packet received from the source network and modifies a destination address field of a network layer header of the copied packet to specify the network layer address of a destination network, wherein the routing engine forwards the copied packet as modified to the destination network.

6. The router of claim 5 wherein the routing engine further includes a broadcast list specifying a plurality of network layer addresses of a corresponding plurality of destination networks, the filter creating a copied packet and modifying the copied packet for each destination network specified by the broadcast list.

7. A network comprising:

a plurality of subnetworks each having a unique network layer address;

a plurality of hosts each operatively coupled to one of the plurality of subnetworks, each host being enabled to transmit local broadcast packets for propagation on its corresponding subnetwork; and a router, the router comprising:

a plurality of ports for coupling to the plurality of subnetworks;

a routing engine coupled to the ports for processing packets received from the plurality of ports, the routing engine including a filter that, when activated for a source subnetwork, copies a local broadcast packet received from the source network and modifies a destination address field of a network layer header of the copied packet to specify the network layer address of a destination network, wherein the routing engine forwards the copied packet as modified to the destination network such that the local broadcast packet is transmitted outside of the source subnetwork.

8. The network of claim 7 wherein the routing engine further includes a broadcast list specifying a plurality of network layer addresses of a corresponding plurality of destination subnetworks, the filter creating a copied packet and modifying the copied packet for each destination subnetwork specified by the broadcast list.

* * * * *

UNITED STATES PATENT AND TRADEMARK OFFICE
CERTIFICATE OF CORRECTION

PATENT NO.  :  5,740,375

DATED  :  April 14, 1998

INVENTOR(S)  :  Dunne et al.

It is certified that error appears in the above-identified patent and that said Letters Patent is hereby corrected as shown below:

In column 5 at line 27 delete "timelion" and insert --function--

In column 6 at line 19 delete "packer" and insert --packet--

Signed and Sealed this

Eleventh Day of August 1998

Attest:

BRUCE LEHMAN

*Attesting Officer*                *Commissioner of Patents and Trademarks*